United States Patent [19]

Geittner et al.

[11] Patent Number: 5,106,402
[45] Date of Patent: Apr. 21, 1992

[54] METHOD OF MANUFACTURING A MONOMODE OPTICAL FIBER

[75] Inventors: Peter E. E. Geittner; Hans-Jürgen E. Hagemann, both of Aachen; Hans-Jürgen Lydtin, Stolberg, all of Fed. Rep. of Germany

[73] Assignee: U.S. Philips Corp., New York, N.Y.

[21] Appl. No.: 590,431

[22] Filed: Sep. 27, 1990

Related U.S. Application Data

[63] Continuation of Ser. No. 239,109, Aug. 31, 1988, abandoned.

[30] Foreign Application Priority Data

Sep. 19, 1987 [DE] Fed. Rep. of Germany ....... 3731604

[51] Int. Cl.$^5$ ............................................. C03C 25/02
[52] U.S. Cl. ................................... 65/3.12; 65/18.2; 385/127; 156/643; 156/662; 427/163
[58] Field of Search ............... 65/3.11, 3.12, 3.2, 65/18.2, DIG. 16; 350/96.33; 427/163, 164, 165, 166, 167; 156/643, 662; 385/127

[56] References Cited

U.S. PATENT DOCUMENTS

| | | | |
|---|---|---|---|
| 3,932,162 | 1/1976 | Blankenship | 65/13 |
| 4,082,420 | 4/1978 | Shiraishi et al. | 65/3.12 |
| 4,114,980 | 9/1978 | Asam et al. | 65/3.12 |
| 4,263,030 | 4/1981 | Kobayashi et al. | 65/DIG. 16 |
| 4,283,213 | 8/1981 | Akers et al. | 65/13 |
| 4,292,063 | 9/1981 | Abe | 65/DIG. 16 |
| 4,306,767 | 12/1981 | Kawachi et al. | 65/3.12 |
| 4,335,934 | 6/1982 | Black et al. | 65/3.12 |
| 4,339,174 | 7/1982 | Levin | 65/3.12 |
| 4,367,013 | 1/1983 | Guerder et al. | 65/3.12 |
| 4,372,648 | 2/1983 | Black | 65/3.12 |
| 4,406,732 | 9/1983 | Kayoun | 156/663 |
| 4,418,984 | 12/1983 | Wysocki | 65/3.11 |
| 4,493,721 | 1/1985 | Auwerda | 65/3.12 |
| 4,575,187 | 3/1986 | Howard et al. | 350/96.33 |
| 4,669,821 | 6/1987 | Blair et al. | 65/3.12 |
| 4,874,222 | 10/1989 | Vacha et al. | 350/96.33 |
| 4,911,742 | 3/1990 | Newbould et al. | 65/3.11 |
| 4,975,102 | 12/1990 | Edahiro et al. | 65/3.12 |

FOREIGN PATENT DOCUMENTS 56-69235 6/1981 Japan .

*Primary Examiner*—Richard V. Fisher
*Assistant Examiner*—John J. Bruckner
*Attorney, Agent, or Firm*—Lesley A. Rhyne; John C. Fox

[57] ABSTRACT

In the manufacture of preforms for optical fibres, the materials of the core ($\alpha$) and of the light-conducting cladding layer ($\beta_1$) are previously deposited from the gaseous phase. Deposition time is here considerably reduced in that only the materials of the core ($\alpha$) and a part of the light-conducting cladding layer ($\beta_1$) are deposited from the gaseous phase and the remaining light-conducting cladding material ($\beta_2+\beta_3$) is supplied as pre-formed tubes of cladding material.

4 Claims, 1 Drawing Sheet

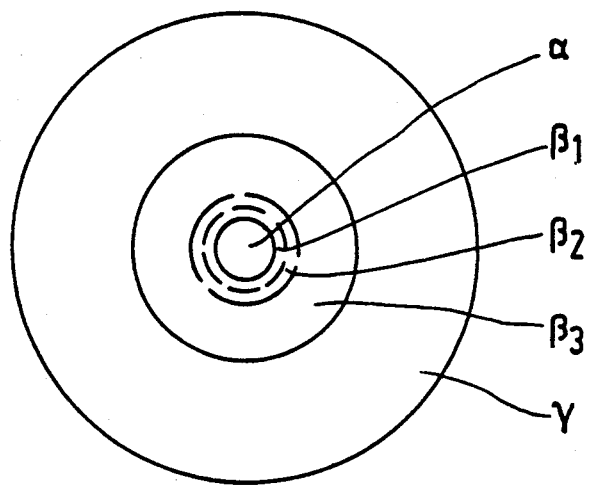

METHOD OF MANUFACTURING A MONOMODE OPTICAL FIBER

This is a continuation of application Ser. No. 07/239,109 filed Aug. 31, 1988, now abandoned.

BACKGROUND OF THE INVENTION

The invention relates to a method of manufacturing a monomode mode optical fibre in which: a preform having a central light-conducting core, a light-conducting cladding layer surrounding the core and optionally a substrate layer surrounding the cladding layer is formed by depositing from the gas phase and optionally then collapsing the core and cladding layer; a non-light conducting material is provided around the preform; and the preform is heated and drawn into a monomode optical fibre.

Methods of this type are known from DE-OS 25 23 401 and 28 06 523 and from U.S. Pat. No. 4,283,213. In these references the known methods of reactive chemical vapor deposition (CVD) from the gaseous phase and rod-in-tube are used. In the rod-in-tube method the rod is the preform and the tube is the non-light conducting material.

In the manufacture of monomode optical fibres on a production scale, the OVD method, the VAD method, the MCVD method, and the PCVD method are used as variations of the CVD method (H. Lydtin "Review of Fiber Manufacturing" *J. Lightwave Technology*, Vol. LT-4, August, 1986, 1016–1038). These methods may be divided into "outer" and "inner" coating methods. A common feature of these methods is to deposit light-conducting core material and light-conducting cladding material from the gaseous phase—after preceding chemical conversion. In the outer coating methods (OVD and VAD), non-light-conducting outer cladding material is deposited directly from the gaseous phase onto the conducting cladding material, whereas in the inner coating methods (MCVD and PCVD), the non-light conducting material is in the form of pre-manufactured substrate tubes and deposition of the light-conducting material occurs on the tube's inner wall.

By the known methods optical fibres of a high bandwidth can be manufactured, the attenuations of which lie near the theoretical limit for the glass/doping systems to be considered. However, to be able to take advantage of the fibre draw rates of more than 1000 meters per minute achievable nowadays, high throughputs in all manufacturing steps, high material yields, very good process control and preforms which produce several 100 kilometers of monomode optical fibres per meter of preform are required.

The preform sizes now in production produce between 30 and 80 km fibre/meter of preform. In the realization of larger preforms the following difficulties are encountered in the CVD method used on a production scale.

In larger preforms produced by the outer coating method, the mechanical stability leaves much to be desired since the density is only a tenth of the theoretical density. The drying, cleaning and sintering devices must be made so as to fit green dimensions up to 2 m in length and approximately 150 mm diameter. Furthermore, a further increase of the deposition rate to approximately 30 g/min. would be required for this method to be able to compete with other methods of manufacturing the non-light-conducting material.

In the inner coating methods, preforms of approximately 300 km of fibre per meter of preform upon deposition of the light-conducting materials require deposition rates of approximately 5 g/min and substrate tubes having inside diameters of approximately 35 to 40 mm. In the deposition of light-conducting materials large preforms require deposition thicknesses of more than approximately 8 mm which present problems for the MCVD method. Thick depositions in large substrate tubes cannot be collapsed by the known methods.

OBJECT AND SUMMARY OF THE INVENTION

It is the object of the invention to increase the cross-section of preforms without increasing the deposition rate and, in the inner coating method, the collapsing expenses.

According to the invention, this object is achieved in a method of the type mentioned in the opening paragraph in which only the required materials of the core area and optionally of a part of the light-conducting cladding layer are deposited from the gas phase, and the other light-conducting cladding materials are added in the form of tubes.

In order to promote the economical production of monomode optical fibres, at most one fifth of the light-conducting material is deposited from the gaseous phase. The share of the deposited material may even be limited to less than one fiftieth of the light-conducting material.

When inner coating methods such as PCVD or MCVD are used, preferably a tube of doped or undoped light conducting cladding material suitable for guiding light is used as a substrate layer for the gas phase deposition.

It is advantageous to use a light conducting tube for the substrate as thin-walled as possible so that the share of said tube is at most one fifth of the light-conducting material. As a result of this the share of the material to be collapsed is kept small which is particularly favorable for the economy of the whole method.

The material deposited from the gas phase may be collapsed to form a compact rod, optionally together with the substrate layer.

The remaining at least three fifths of the light-conducting material is provided around the rod in the form of additional tubes. The advantage of this is that at least three fifths of the light-conducting material must neither be deposited nor optionally be collapsed. In accordance with the desired fibre construction the share of the light-conducting material added in the form of tubes can even be increased to more than nine tenths in many cases.

In a further advantageous embodiment of the method according to the invention, doped or undoped $SiO_2$ glass is used as a light-conducting material.

The method according to the invention is particularly advantageous when the cross-sectional area of the core material deposited from the gaseous phase is chosen to be comparatively large, for example between 10 and 100 $mm^2$, to manufacture a large preform for several 100 kilometers of monomode optical fibres, because in that case the quantity of the light-conducting material added in the form of tubes becomes correspondingly large.

In order to avoid contamination of the boundary phases in the light-conducting material with OH groups, water and other contaminants, the surfaces of the tubes and of the compact rod are etched with a flowing gaseous etchant and a localized plasma zone, in which a relative movement occurs between the surfaces and the plasma. Such an etching method is described in European Patent Specification 91 173.

Etching may also be carried out by covering the surfaces of the tubes and of the compact rods entirely with a plasma which is temporarily pulsated, while the gaseous etchant is supplied and removed constantly or in a pulsated manner.

As an etchant, a mixture of oxygen with a gas the molecules of which comprise halogen atoms, may be used. The halogens are preferably fluorine and chlorine. Further constituents of the molecules may include carbon, sulphur and oxygen. Reaction of the etchant molecules with the atoms of the glass surface preferably form easily volatile and comparatively stable compounds. Examples of suitable gases are in particular $CF_4$, $C_2F_6$, $C_3F_8$, $C_4F_{10}$, $CCl_3F$, $CCl_2F_2$ and $SOCl_2$. The mixing ratio of the oxygen to the overall amount of the halogen-containing gases should be in the range of approximately 1:1 to 50:1.

The pressure in the etching volume is chosen to be in the range of 1 to 50 hPa, preferably in the range of 10 to 25 hPa. The temperature on the basis of outer heat sources should not exceed 900° C., is preferably even restricted to temperatures below 400° C., e.g., not above room temperature.

Under these conditions of pressure and temperature, the gaseous etching agents mentioned are stable. The feed lines are not attacked and reactions with the surface do not occur without the presence of plasma.

In order to induce etching, a low-pressure gas discharge is preferably used as a plasma, maintained by a device which does not have any electrode in the etching volume, preferably a microwave resonator. At the indicated pressures and typical powers of from a few hundred Watts to a few Kilowatts coupled in the plasma, the expansion of the plasma zone remains substantially restricted to the area of the applicator. The gas supply and exhaust is now arranged so that the gas which serves as etchant enters the plasma on one side and the reaction products are exhausted on one of the other sides. The activation of the etchant takes place immediately upon introduction of the plasma.

The activated species diffuse to the glass surface, react with the glass surface and so produce the desired cleaning.

After the exhaust from the area of the gas discharge again predominantly stable gaseous compounds are formed which are exhausted from the volume to be cleaned in the direction of flow of the gas.

By performing a uniform relative movement between the plasma inducing device and the glass surface at a rate which is small compared with that of the flowing gas, the etching localized to the plasma area is applied uniformly to the surface of the glass.

Due to the movement of the plasma, the energy is dissipated in a short period of time on each element of the glass surface so that the temperature of the surface does not increase unacceptably. This is important because otherwise surface impurities, in particular water, OH groups and monovalent ions, for example Cu and Na, might diffuse into the interior of the glass.

When the products of the cleaning reaction are substantially stable and gaseous, a portion of these molecules may be adsorbed downstream on the surface. Cluster formation and subsequent deposition of the molecules on the surface may also take place. These disadvantages are avoided when plasma movement occurs in the direction of the gas flow. Optionally, deposits from the etching reaction are again removed in a surface portion situated further to the gas inlet and in this manner all impurities and surface coatings are transported successively and completely to the gas outlet.

When the plasma, for example a low pressure gas discharge, does not burn continuously, but is pulsated, a uniform cleaning may be achieved without the temperature of the glass surfaces rising above at most 800° C. During the times at which no plasma burns a complete exchange of the product of the etching reaction with the unreacted etching gas takes place. Whether the etching gas flows continuously or is reacted without flow and is then exhausted depends on the special character of the cleaning and the process conditions, for example flow rate of the gas, dissipated power of the discharge and pressure.

In certain circumstances, for example, in large reaction chambers, it is also possible to carry out cleaning by use of an isothermal high-pressure plasma instead of low-pressure discharge, for example, when quartz tubes having a large inside diameter are cleaned by means of a localized plasma which is moved relative to the tube.

BRIEF DESCRIPTION OF THE DRAWING

The invention will now be described in greater detail with reference to a drawing in which the sole FIGURE is a cross-sectional view of a monomode optical fibre showing three circular zones $\alpha$, $\beta$ and $\gamma$, the zone $\beta$ sub-divided into areas $\beta_1$, $\beta_2$ and $\beta_3$.

DESCRIPTION OF PREFERRED EMBODIMENTS

The zone $\alpha$ marks the central light-conducting core which in monomode fibres has a diameter of 10 to 15 $\mu$m, a high purity, a refractive index which varies as a function of the radius, and a mass which is approximately 1 to 2% of the overall fibre mass.

The zone $\beta$ adjoining $\alpha$ represents the light-conducting cladding area; this zone has an outside diameter of 50 to 60 $\mu$m and must also be of high purity since approximately 15 to 20% of the light energy is still guided in it. The purity requirements, however, are not so sharp as in the zone $\alpha$ since the light energy rapidly decreases from the boundary face between the zones $\alpha$ and $\beta$ to the outside.

In contrast with the core zone $\alpha$, which has a varying material composition, the material of the light-conducting cladding zone $\beta$ consists substantially of a pure or doped $SiO_2$ glass, having a constant composition. The broken lines inside $\beta$ sub-divide the high-purity light-conducting cladding material into three areas $\beta_1$, $\beta_2$ and $\beta_3$ which are not distinct as regards their compositions.

The mass of the light-conducting cladding zone $\beta$ is approximately 20% of the overall fibre mass.

The outer cladding area $\gamma$ in the fibre has a diameter of 125 $\mu$m and contributes substantially to the fibre rigidity and has a mass of approximately 80% of the overall fibre mass. The purity requirements of this zone are not critical as regards OH and most other contaminations since it does not serve for light guiding. However, for reasons of corrosion resistance and rigidity, the composition of this material should consist of pure or weakly doped $SiO_2$ glass.

An essential feature of the invention is the manufacture of the light-conducting core zone $\alpha$ and optionally a small area $\beta_1$ of the light-conducting cladding zone $\beta$ by one of the CVD methods, and the areas $\beta_2$, $\beta_3$ and $\gamma$ by means of prefabricated tubes.

When the VAD and OVD methods are used the area $\beta_2$ is absent.

When the MCVD and PCVD methods are used the inner coating occurs in a substrate tube (material $\beta_2$) which is as thin-walled as possible and of high purity. In case the material $\alpha$ should be structured in the refractive index the coating should preferably be carried out with the PCVD method.

The method according to the invention enables the manufacture of large preforms for monomode optical fibres, without the need for increased deposition rates and without the development of a collapsing method for large tubes (MCVD, PCVD) or the handling of large porous preforms (OVD, VAD).

For performing the method according to the invention, doped or undoped silica substrate tubes of high purity having inside diameters between 15 and 25 mm are required. The manufacture of such tubes is described by M. Toki, S. Miyashita, T. Takendi, S. Kambe and A. Kodi (Seiko Epson Co.) in *Glass*, No. 4 (1987) p. 125, and is suggested in German Patent Application P 36 19 510.3, P 36 35 847.9 and P 37 02 025.0.

An essential advantage of the inner coating embodiments of the invention is that the share of fibre to be collapsed is reduced from approximately 30 to 40% (prior art) to approximately 5%. As a result, the collapsing times, the evaporation losses and attendant profile disturbances can be considerably reduced.

The light-conducting cladding area $\beta_3$ and the enveloping zone $\gamma$ are applied to the finish preform after the collapsing step by means of the rod-in-tube technique using suitably dimensioned tubes.

Performs of approximately 300 or more km in length can be manufactured by this method using the known techniques of PCVD, MCVD, VAD, OVD, collapsing and rod-in-tube.

EXAMPLE 1

Preforms were manufactured for monomode optical fibres having a core diameter of 10 $\mu$m and a refractive index gradient of approximately 0.3%. The preforms were designed so that 160 km of fibre per meter of preform could be manufactured.

The preforms were manufactured by two methods:

a) according to the prior art by deposition of silica and doped silica equivalent to 10 $\mu$m core diameter and 60 $\mu$m cladding diameter. The deposition was carried out by the PCVD method in a commercially available silica substrate tube (typical impurities: 150,000 ppb OH, 2000 ppb Ca, 100 ppb Fe, 100 ppb Sb), (1 ppb means 1 ng per g of $SiO_2$) with an outside diameter of 35 mm and a wall thickness of 2 mm under the following conditions:

Oxygen flow 3000 sccm, $SiCl_4$ flow 746 sccm, $GeCl_4$ flow (SM core) 40 sccm, microwave power 4 kW, coating length 100 cm, stroke rate 15 m/min. Sscm means $cm^3$/min related to standard conditions (0° C., 1013 hPa).

The covering tube for the rod-in-tube method step has an inside diameter of 31 mm and an outside diameter of 52 mm.

b) according to the method of the invention by deposition only of the core material (corresponding to 10 $\mu$m in the fibre) in a silica substrate tube of high purity (typical impurities: 300 ppb OH, approximately 200 ppb Na, approximately 150 ppb Ca, <15 ppb Fe, <5 ppb Cr, <2 ppb Cu) which had an outside diameter of 17 mm and a wall thickness of 1 mm. The deposition was carried out under the following PCVD conditions:

Oxygen flow 745 sccm, $SiC_4$ flow 186 sccm, $GeCl_4$ flow 10 sccm, microwave power 1 kW, coating length 100 cm, stroke rate 7 m/min.

The outside diameter of the collapsed preform was approximately 9 mm. For the rod-in-tube method steps, a covering tube ($\beta_2$ area) of high purity of 12 mm inside diameter and 45 mm outside diameter and a covering tube ($\gamma$ area) of 27 mm inside diameter and approximately 52 mm outside diameter were used.

In the case a) it was required to deposit a cross-sectional area of 450 $mm^2$ PCVD-silica (thickness approximately 6 mm). With the substrate tube used which grew from an initial inside diameter of 31 mm to 19 mm in the course of the coating, an average deposition rate of at most approximately 2 g/min could be realized. This means that a PCVD coating time of approximately 8 hours was required for the manufacture of a preform having the length Z=1 m:

$$t^{PCVD}/Z = 5 \text{ min/cm.}$$

To collapse this preform with an overall cross-sectional area of 660 $mm^2$ (coating and substrate) a time of 25 hours had to be used:

$$t^{coll}/Z = 15 \text{ min/cm.}$$

To process said preform further to fibres having an outside diameter of 125 $\mu$m, a coating by means of the normal rod-in-tube method was required on an outside diameter of 52 mm corresponding to an effective cross-section of 2000 $mm^2$ silica.

In the case b) only the deposition of 12.6 $mm^2$ of cross-sectional area by means of the PCVD method was necessary due to the restriction to the light-conducting core. A preform was obtained having an overall cross-sectional area of approximately 60 $mm^2$ with a deposited thickness of the doped PCVD-silica of approximately 0.25 mm. This deposition could be produced at a constant deposition rate of 0.5 g/min. So for the coating of a 1 m long substrate tube approximately 1 hour was necessary:

$$t^{PCVD}/Z = 0.56 \text{ min/cm.}$$

The effectivity gain in collapsing, despite the rather high share of the substrate tube material in this example ($m^{substr}/m^{PCVD} \approx 5$), is only:

$$t^{coll}/Z = 1 \text{ min/cm.}$$

Hence for the manufacture of the preform of 1 m length, a total of only approximately 2.5 hours of coating and collapsing time were necessary to produce a preform which is fully analogous to the case a).

In this example the time for coating and collapsing by the method according to the invention was only approximately 7% of the time which had to be spent by the prior art inner coating method.

Moreover, the quantity of the silica which had to be deposited by the CVD method in the case b) was only approximately 3% of the quantity deposited in the prior art case a).

EXAMPLE 2

This example relates to the manufacture of optical fibres by means of the PCVD method in which the substrate tubes having an outside diameter of approximately 26 mm and a wall thickness of approximately 4 mm consist of silica of high purity. The substrate tubes were coated with approximately 35 μm of undoped $SiO_2$ and approximately 20 μm of $SiO_2$ doped with approximately 3.5% of $GeO_2$. The coated substrate tubes were collapsed to form rods, and optical fibres having a diameter of 125 μm were drawn from the rods. Consequently the core of these optical fibres had a diameter of approximately 11 μm and a refractive index which was approximately 0.27% higher than that of the envelope.

A fibre series N was manufactured by the conventional PCVD method: the silica substrate tube was wet-chemically etched, rinsed, dried and clamped onto the coating device. The inner volume was exhausted with flowing dry oxygen, the substrate tube temperature was raised to approximately 1200° C., and undoped $SiO_2$ (layer thickness 35 μm) succeeded by Ge-doped $SiO_2$ (layer thickness 20 μm) were deposited.

In addition in a fibre series R the cleaning method according to the invention was used prior to raising the substrate tube temperature:

A mixture of oxygen and $C_2F_6$ was used as an etching gas. The flows were 90 sccm $O_2$ and 10 sccm $C_2F_6$ and the pressure was adjusted at 10 hPa. A coaxial microwave resonator was used as a plasma-exciting device. The microwave power of 900 W was supplied by means of a constant current magnetron operating at approximately 2450 Hz. The microwave resonator and hence also the plasma burning in the interior of the substrate tube was reciprocated along the substrate tube to be coated at a rate of 25 cm/sec for approximately 200 cycles.

The optical losses on the basis of light scattering did not distinguish significantly in the two series and corresponded substantially to those of known monomode optical fibres having a $GeO_2$-doped core. Both series, however, were considerably different with respect to losses on the basis of OH absorption bands. Within the wavelength range of approximately 800 nm to 1600 nm relevant for optical fibres, the OH band absorption at approximately 1380 nm is the strongest. Consequently this is used for the comparison of the two fibre series:

Attenuation on the basis of 1380 nm-OH band:
fibre series N 900 dB/km±30%
fibre series R 6 dB/km±15%.

The comparison shows that cleaning of the inner surface of the quartz substrate tube effectively removes deposits with $H_2O$ and OH which are present there and which, if not removed, would allow the diffusion of OH impurities during the high-temperature step in the fibre manufacture, resulting in their distribution substantially uniformly in the central area of the fibre.

From this the effectivity of the cleaning step according to the invention may be estimated:

An OH attenuation of 40 dB/km at 1380 nm corresponds to an average OH content in the light-conducting area of the fibre of approximately 1 ppm (1 μg OH per 1 g $SiO_2$). Compare J. E. Shelbey, J. Vikto Jr., R. E. Benner, *J. Am. Ceram. Soc.*, 65 (1982) C 59. From this it appears that the average OH content in the central area of fibres of the series N is approximately 20 ppm and in the fibres of the series R only approximately 0.15 ppm.

The comparison shows that the 20 ppm OH in the series N originate very predominantly from the presence of water on the inner surface.

EXAMPLE 3

Combinations of silica tubes and tube-rod combinations were cleaned. The following combinations were tested:

a) a silica rod having a diameter of 12 mm of OH-free silica of high purity was mounted concentrically in a silica tube of normal substrate quality (OH content approximately 200 ppm) having an outside diameter of 26 mm and a wall thickness of 1.5 mm.

b) a substrate tube of high purity having an outside diameter of 17 mm and a wall thickness of approximately 1.0 mm was provided concentrically in a silica tube having an outside diameter of 26 mm and a wall thickness of 1.5 mm, both tubes being connected separately to a gas supply and to a pump.

c) a preform having a diameter of approximately 9 mm which was manufactured by collapsing a substrate tube of high purity silica with a PCVD inner coating, was mounted in a silica tube of high purity having an outside diameter of 26 mm and a wall thickness of 7 mm, the tube being connected to the gas supply and the pump.

The combinations were wet chemically etched, rinsed, dried and clamped onto the coating device. The effectiveness of the cleaning method according to the invention was examined by a series of experiments in which the plasma exciting device was a coaxial microwave resonator which was arranged concentrically outside the rod-tube combinations and the tube combination, respectively.

In the cases a) and c) the pressure in the gap between rod and tube was reduced to 20 mbar with flowing etching gas. The plasma inducing the etching burned in said gap when microwave energy was supplied.

A mixture of $O_2$ and $C_2F_6$ served as the etching gas. The mixing ratio was varied from 5:1 to 20:1 of $O_2$ to $C_2F_6$, the overall flow $Q_{O2}+Q_{C2F6}$ being varied from 50 sccm to 400 sccm, the pressure from 7 hPa to 20 hPa and the plasma power from 600 W to 1500 W. The microwave resonator was reciprocated over the etching volume at a rate of 25 cm/sec. By measuring the weight losses after 7, 15 and 30 minutes of etching time, it was established that: per 100 $C_2F_6$ molecules which were supplied, 165 $SiO_2$ molecules were removed from the glass surface; that the etching attack was uniform over the length of the etched zone (equal to stroke length of the reciprocating movement); and that the weight loss was distributed on the tube and the rod in accordance with their cross-sectional areas.

In the case a) a coating with F-doped silica was deposited by the PCVD method after cleaning of the rod and the tube inner surfaces, the rod-tube combination was collapsed to a preform.

In the case c) the outer silica tube, after surface cleaning at the preform ends, was collapsed on the preform and then, after providing further covering tubes of normal quality (for example, Heraeus natural quartz), processed to a preform of 60 cm length (fibre equivalent approximately 100 km) according to the rod-in-tube technique.

In the case c) the inner tube was to be coated by means of the PCVD method in which both surfaces of the said tube were to be cleaned according to the method of the invention and to be kept clean during the PCVD coating. Cleaning was effected successively in the inner tube and in the gap between the two tubes by first reducing the pressure in the inner tube to 10 hPa while maintaining the pressure in the gap in the range of 1000 hPa so that the plasma was excited only in the interior for cleaning. The pressure ratios were then inverted and the gap area was cleaned.

In all cases the surfaces could be etched and cleaned homogeneously.

We claim:

1. A method of manufacturing a monomode optical fibre in which a preform comprising a light-conducting core, a light-conducting cladding layer surrounding the core and a nonlight-conducting cladding layer surrounding the light-conducting cladding layer is formed, the method comprising the steps of:
   a) depositing the core and part of the light-conducting cladding layer from a gas phase;
   b) providing the remaining part of the light-conducting cladding layer in the form of two or more pre-fabricated concentrically arranged tubes of a light-conducting cladding material, said tubes comprising an inner tube used as the substrate for the gas phase deposition and one or more outer tubes of said light-conducting cladding material wherein at most one fifth of the light-conducting material is provided in the form of the tube serving as the substrate and at most one fifth of the light conducting cladding layer is deposited from the gas phase;
   c) providing the nonlight-conducting cladding layer in the form of one or more pre-fabricated concentrically arranged tubes of a material having a different composition from said light-conducting cladding material; and
   d) heating and drawing the preform to form the monomode optical fibre.

2. The method of claim 1 wherein the surfaces of the two or more pre-fabricated concentrically arranged tubes are etched with a flowing gaseous etchant and a localised plasma zone, while maintaining relative movement between the surfaces and the plasma.

3. The method of claim 2 wherein the etchant is supplied upstream near the plasma and exhausted downstream behind the plasma.

4. The method of claim 1 wherein a plasma fully covers the surfaces of the tubes, and is temporarily pulsated.

* * * * *